United States Patent [19]

Chanroo et al.

[11] Patent Number: 5,450,612
[45] Date of Patent: Sep. 12, 1995

[54] COMMUNICATION SYSTEM FOR COMMUNICATING WITH A PLURALITY OF SELECTIVE CALL RECEIVERS AND METHOD THEREFOR

[75] Inventors: Keith A. Chanroo, Coral Springs; Zaffer S. Merchant, Lantana; Xiaojun Li, Boynton Beach, all of Fla.

[73] Assignee: Motorola, Inc., Schaumburg, Ill.

[21] Appl. No.: 112,156

[22] Filed: Aug. 26, 1993

[51] Int. Cl.⁶ .............................................. H04B 7/00
[52] U.S. Cl. .................... 455/38.1; 455/52.1; 370/23
[58] Field of Search ............... 455/38.1, 38.2, 33.3, 455/54.1, 56.1, 52.1, 52.2, 52.3; 340/825.73, 825.44, 825.71, 825.76, 825.62; 370/23, 110.3; 364/724.08, 724.09, 726, 567

[56] References Cited

U.S. PATENT DOCUMENTS

| | | | |
|---|---|---|---|
| 4,245,325 | 1/1981 | Kikuchi et al. | 370/23 |
| 4,701,934 | 10/1987 | Jasper | 375/1 |
| 4,823,123 | 4/1989 | Siwiak | |
| 4,875,038 | 10/1989 | Siwiak et al. | |
| 4,888,793 | 12/1989 | Chanroo | |
| 5,260,700 | 11/1993 | Merchant et al. | 455/33.3 |
| 5,299,149 | 3/1994 | Morita et al. | 364/576 |
| 5,323,391 | 6/1994 | Harrison | 364/576 |

Primary Examiner—Edward F. Urban
Assistant Examiner—Mary M. Lin
Attorney, Agent, or Firm—Keith A. Chanroo

[57] ABSTRACT

A selective call base station (100) for receiving a signal comprising a plurality of communication signals has an Analog-to-Digital (A/D) converter (220) for digitizing the signal. A memory (204) for storing the signal as a plurality of digitized bits (502–518), and a Digital Signal Processor (DSP) (218) for converting each of the plurality of digitized bits (502–518) into a frequency domain signal (FIG. 6) that has a plurality of frequency samples. The memory (204) stores the plurality of frequency samples corresponding to each of the plurality of digitized bits (502–518). A decoder (206, 218) decodes the plurality of communication signals from the plurality of frequency samples. The decoder (206, 218) further includes a generator (718) for generating a window (902) for measuring energy of at least one frequency sample of the plurality of digitized bits (502–518) in each of the plurality of communication signals. A determinator (728) determines the at least one frequency sample of each of the plurality of communication signals having a maximum energy.

21 Claims, 6 Drawing Sheets

COMMUNICATION SYSTEM FOR COMMUNICATING WITH A PLURALITY OF SELECTIVE CALL RECEIVERS AND METHOD THEREFOR

FIELD OF THE INVENTION

This invention relates in general to communication systems and more particularly to a communication system and method for communicating with a plurality of selective call receivers.

BACKGROUND OF THE INVENTION

Communication on a wide band channel requires a passband filter at the input of the signal. The response of the passband filter should accurately receive the wideband signal making a discriminator type demodulator suitably efficient for decoding the wideband signal. However, when the signal to be received comprises a plurality of narrowband signals within a single wideband channel, the plurality of narrow band signals are decoded by using a plurality of filters having a response tuned to each of the frequencies. The plurality of filters provide a very cost intensive decoding technique.

Unfortunately, with communication on a narrow band channel, the received signal suffers from two major problems: fading and frequency offset. With fading, the envelope and the phase of the received signal vary in a random manner because of multi-path effects. If a transmitted frequency modulated (FM) signal has a bandwidth less than the coherence bandwidth of the multipath channel, the random FM noise produced by the received signal phase variations will be superimposed on the desired modulation. Therefore, when a conventional discriminator is used to demodulate the signal, the random FM places an upper boundary on the baseband signal-to-noise ratio achievable at the output of the frequency discriminator. Also, the upper bound of the signal-to-noise ratio (ceiling) gets lower for a narrow band signal. This ceiling results in a floor in the error rate for the demodulation.

Additionally, the narrow band signals have a random frequency offset causing the narrow band signals to be received at different positions within their subchannels. Therefore, the plurality of narrow bandpass filters must have a frequency response at least equal to each of narrow band subchannels. By increasing the bandwidth of the narrow bandpass filters, the signals will arrive within the bandwidth of the narrow bandpass filters. Unfortunately, to guarantee the reception of each narrow band signal, the signal to noise ratio of the filter must be severely degraded.

Thus what is needed is a method and apparatus for receiving and decoding the plurality of narrow band signals for generating a high signal to noise ratio in a cost effect manner.

SUMMARY OF THE INVENTION

A method for receiving a signal comprising a plurality of communication signals comprises the steps of: a) digitizing the signal corresponding to a plurality of digitized bits; b) converting each of the plurality of digitized bits into a frequency domain signal comprising a plurality of frequency samples; c) storing the plurality of frequency samples corresponding to each of the plurality of digitized bits; and d) decoding the plurality of communication signals from the plurality of frequency samples. The step of decoding further comprises the steps of: e) generating a window for measuring energy of at least one frequency sample of the plurality of digitized bits in each of the plurality of communication signals; and f) determining the at least one frequency sample of each of the plurality of communication signals having a maximum energy.

A selective call base station for receiving a signal comprising a plurality of communication signals comprises an Analog-to-Digital (A/D) converter for digitizing the signal, a memory for storing the signal as a plurality of digitized bits, and a Digital Signal Processor (DSP) for converting each of the plurality of digitized bits into a frequency domain signal comprising a plurality of frequency samples. The memory stores the plurality of frequency samples corresponding to each of the plurality of digitized bits. A decoder decodes the plurality of communication signals from the plurality of frequency samples. The decoder further comprises a generator for generating a window for measuring energy of at least one frequency sample of the plurality of digitized bits in each of the plurality of communication signals. A determinator determines the at least one frequency sample of each of the plurality of communication signals having a maximum energy.

DESCRIPTION OF A PREFERRED EMBODIMENT

Figure 1:
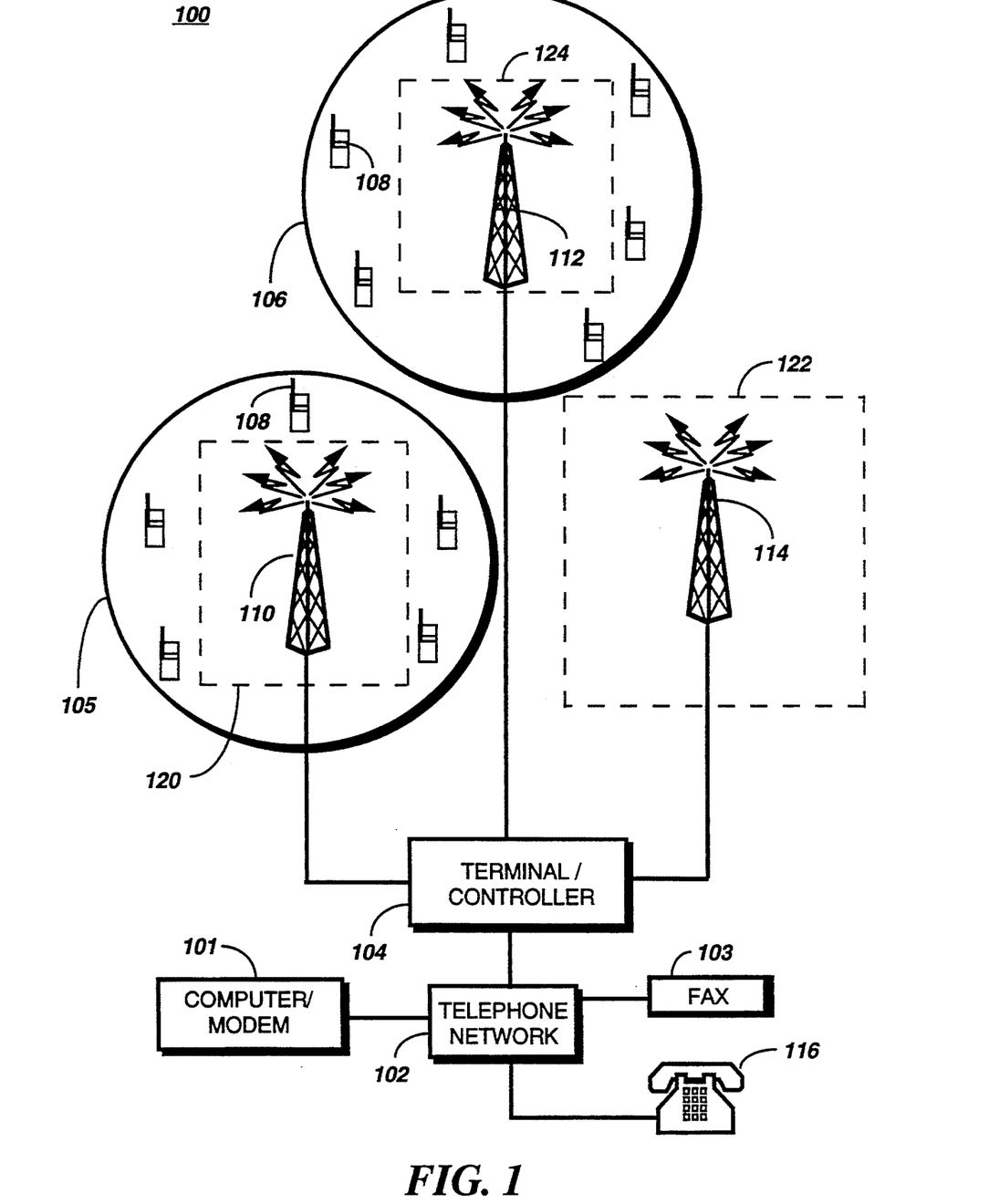
FIG. 1 is an electrical block diagram of a selective call communication system in accordance with the preferred embodiment of the present invention.

Referring to FIG. 1, a selective call communication system 100 in accordance with a preferred embodiment of the present invention is shown. The selective call communication system 100 comprise a terminal/controller 104 coupled to a computer (not shown) via a modem 101 and a facsimile (FAX) machine 103 and a telephone 116 via a conventional public or private telephone network 102 known to one of ordinary skill in the art. The telephone network 102 through the terminal/controller 104 is coupled to a plurality of selective call base stations (or sites) 120-124. The plurality of selective call base stations 120-124 transmit and receive signals via its respective transmitters/receivers 110-114. The details of the operation of the selective call base stations 110-114 will be discussed below. The plurality of selective call base sites 120-124 have an associated coverage area (for example, 105 and 106) into which signals from the terminal/controller 104 are broadcast and received by at least one of a plurality of selective call receivers 108.

Figure 2:
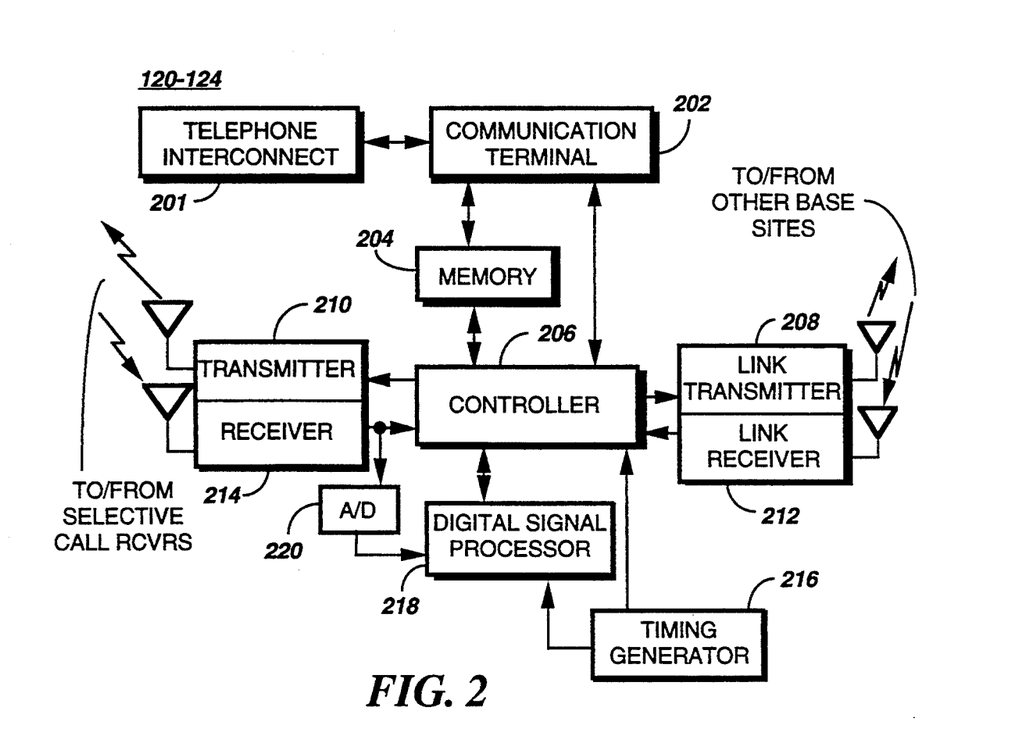
FIG. 2 is an electrical block diagram of a selective call base station in accordance with the preferred embodiment of the present invention.

Referring to FIG. 2, a more detailed block diagram of the selective call base stations 120-124 are shown in accordance with the preferred embodiment of the present invention. The selective call base stations 120-124 comprise a telephone interconnect 201 which allows messages to enter into the selective call communication system 100 through a public or private telephone network using, for example, a telephone 116, a computer 102, a facsimile 103 or an alphanumeric entry device 35 (not shown). A communication terminal 202, for example the Motorola's MODEN PLUS Encoder, processes the information received through the telephone interconnect 201. A generated address and message decoded from the received information are stored in a memory 204 until the next transmission cycle.

As shown, the communication terminal 202 is coupled to a controller 206, which controls the operation of a link transmitter 208, a communicating transmitter 210, a link receiver 212, and a communicating receiver 214. An example of a controller suitable for use in the present invention is Motorola's MC6809 controller. A timing generator 216, coupled to the controller 206, provides a high accuracy clock to maintain system timing for communication and synchronization of the selective call communication system 100 including all the selective call base stations 120-124 and the plurality of selective call receiver 108 by techniques known to one skilled in the arts. Operationally, the communicating transmitter 210 transmits, to the plurality of selective call receivers 108, a signal which comprises a paging type message preferably on a first frequency at the transmission cycle. Preferably, a group of selective call receivers are intended (addressed) by the communicating transmitter 210 to receive the paging message. As is known, the paging message before transmission transmitting is encoded with the appropriate address for addressing the group of selective call receivers of the plurality of selective call receivers 108. For example, and according to the preferred embodiment of the present invention, when a group of the plurality of the selective call receivers 108 have been pager, the selective call receivers of the group that received the message will substantially simultaneously the transmit a response, the acknowledge back signals. Preferably, the acknowledge back response (acknowledgment) is transmitted on a second frequency preferably substantially lower than the first frequency. The receiver 214 of the selective call base stations 120-124 receives the acknowledge back response (acknowledgment signal or ack-back signal) which is stored in a memory 204. As is well known, the receiver 214 demodulates the ack-back signal to produce preferably a baseband signal. The baseband signal is converted (digitized) from an analog signal to a digital signal by an analog-to-digital (A/D) converter 220 known to one of ordinary skill in the art. The conversion by the A/D converter 220 are received and stored by a digital Signal Processor (DSP) 218. The DSP 218, for example, can include a Motorola's DSP56100 or a Texas Instrument's TMS3000 series digital signal processors. According to the preferred embodiment of the present invention, the DSP 218 stores the digitized samples as digitized bits and continuously receives and stores the digitized samples until all bits of the ack-back signal have been received and stored. The digitized samples are retrieved and each bit is converted into its spectral domain representation. Preferably, the DSP 218 performs a Fast Fourier Transform (FFT) on each digitized bit to generate the frequency domain signal which comprises the plurality of ack-back signals received as a composite time domain signal from the responding selective call receivers of the group of selective call receiver 108. The timing generator 216 is coupled to the DSP 218 to provide synchronization and timing for processing the plurality of digitized bits comprising the plurality of ack-back signal. The operation of the DSP 218 will be discussed in detail below.

Figure 3:
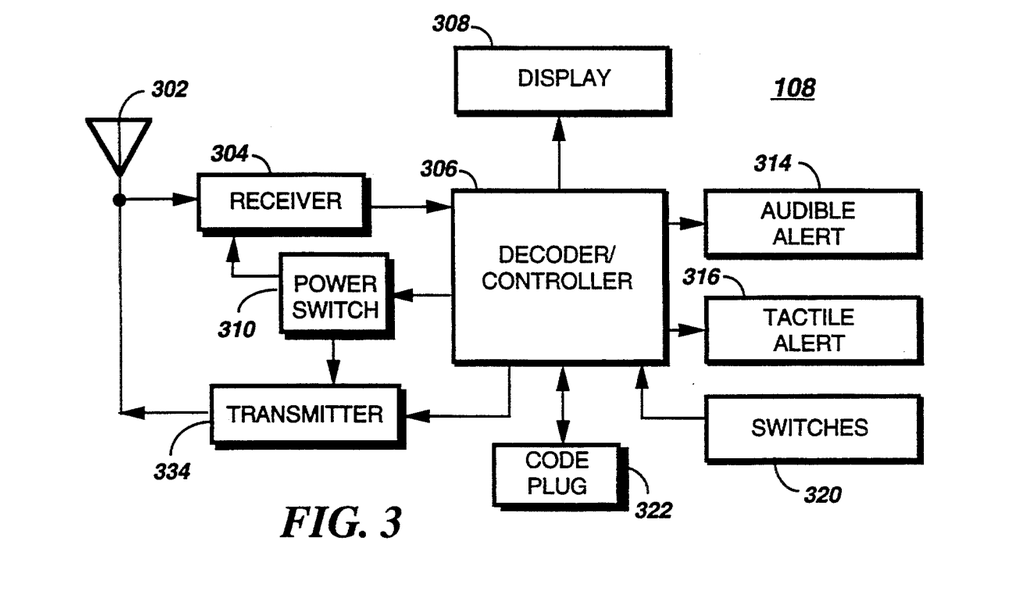
FIG. 3 is an electrical block diagram of a selective call receiver in accordance with the preferred embodiment of the present invention.

Referring to FIG. 3, an electrical block diagram of a selective call receiver is shown in accordance with the preferred embodiment of the present invention. The selective call receiver 108 comprises an antenna 302 for intercepting transmitted radio frequency (RF) signals which are coupled to the input of a receiver 304. The RF signals are preferably selective call (paging) message signals which provide, for example, a receiver address and an associated message, such as numeric or alphanumeric message. However, it will be appreciated that other well known paging signaling formats, such as tone only signaling or tone and voice signaling, would be suitable for use as well. The receiver 304 processes the RF signal and produces at the output a data stream representative of a demodulated data information. The demodulated data information is coupled into the input of a decoder/controller 306 which processes the information in a manner well known in the art. A transmitter 334 is coupled to the antenna 302 and the decoder/controller 306. A power switch 310, coupled to the decoder/controller 306, is used to control the supply of power to the receiver 304, thereby providing a battery saving function, and to the transmitter 334 for transmitting the ack-back response subsequent to the receipt of a paging message which will be further discussed in detail below.

For purposes of this illustration, it will be assumed that the Post Office Code Standardisation Advisory Group ("POCSAG") signaling format is utilized which is well known in the art, although other signaling formats could be utilized as well. When the address is received by the decoder/controller 306, the received address is compared with one or more addresses stored in a code plug (or code memory) 322, and when a match is detected, an alert signal is generated to alert a user that a selective call message, or page, has been received. The alert signal is directed to an audible alerting device 314 for generating an audible alert or to a tactile alerting device 316 for generating a silent vibrating alert. Switches 320 allow the user of the selective call receiver to, among other things, select between the audible alert 314 and the tactile alert 316 in a manner well known in the art.

The message information which is subsequently received is stored in memory 404 (FIG. 4) and can be accessed by the user for display using one or more of the switches 320 which provide such additional functions as reset, read, and delete, etc. Specifically, by the use of appropriate functions provided by the switches 320, the stored message is recovered from memory and processed by the decoder/controller 206 for displaying by a display 308 which enables the user to view the message. The receipt of the message by the selective call receiver 108 can automatically generate the ack-back response to the selective call base station to inform it that the message was successfully received. Preferably, the user will have the opportunity to input a message by using switches 320 or some other input devices well known to one of ordinary skilled in the arts. When the message is entered, the decoder/controller 306 processes the message by encoding an addressed derived from the received message to generate the ack-back response. The encoded ack-back response is then transmitted to the selective call base station that originated the paging message by techniques well known to one of ordinary skill in the art.

Figure 4:
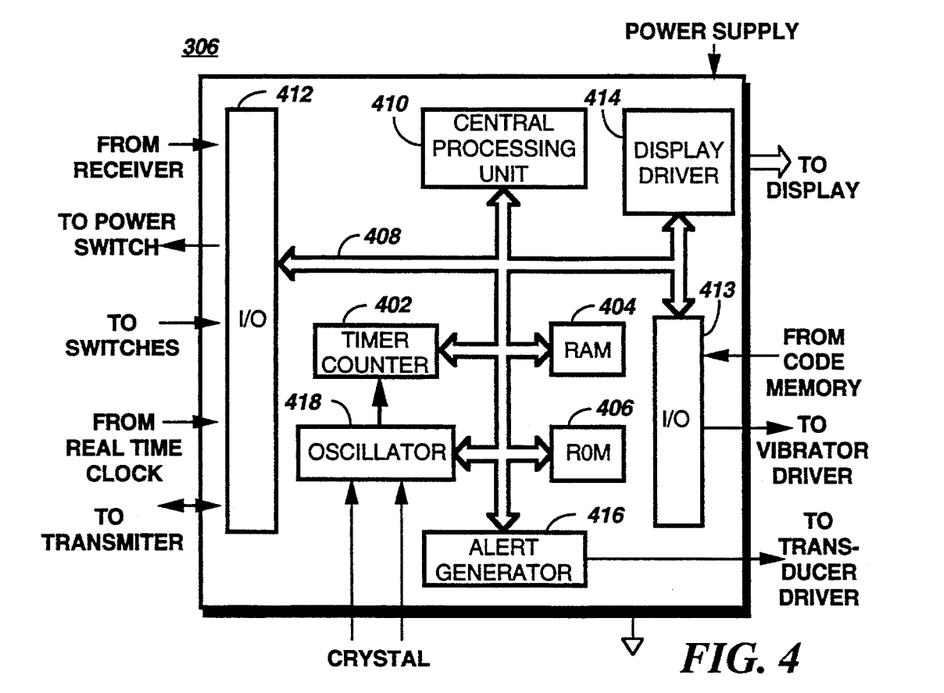
FIG. 4 is an electrical block diagram of a microcomputer based decoder/controller suitable for use in the selective call receiver of FIG. 3.

The controller/decoder 306 of FIG. 3 can be implemented utilizing a microcomputer as shown in FIG. 4. FIG. 4 is an electrical block diagram of a microcomputer based decoder/controller suitable for use in the selective call receiver of FIG. 3. As shown, the microcomputer 306 is preferably of the MC68HC05 series microcomputers, such as manufactured by Motorola, Inc., which includes an on-board display driver 414. The microcomputer 306 includes an oscillator 418 which generates the timing signals utilized in the operation of the microcomputer 306. A crystal, or crystal oscillator (not shown) is coupled to the inputs of the oscillator 418 to provide a reference signal for establishing the microcomputer timing. A timer/counter 402 couples to the oscillator 418 and provides programmable timing functions which are utilized in controlling the operation of the receiver or the processor. A RAM (random access memory) 404 is utilized to store variables derived during processing, as well as to provide storage of message information which are received during operation as a selective call receiver. A ROM (read only memory) 406 stores the subroutines which control the operation of the receiver or the processor which will be discussed further. It will be appreciated that in many microcomputer implementations, the programmable-ROM (PROM) memory area can be provided either by a programmable read only memory (PROM) or an EEPROM (electrically erasable programmable read only memory). The oscillator 418, timer/counter 402, RAM 404, and ROM 406 are coupled through an address/data/control bus 408 to a central processing unit (CPU) 410 which performs the instructions and controls the operations of the microcomputer 306.

The demodulated data generated by the receiver is coupled into the microcomputer 306 through an input-/output (I/O) port 412. The demodulated data is processed by the CPU 410, and when the received address is the same as stored within the code-plug memory which couples into the microcomputer through, for example an I/O port 413, the message, if any, is received and stored in RAM 404. Recovery of the stored message, and selection of the predetermined destination address, is provided by the switches which are coupled to the I/O port 412. The microcomputer 306 then recovers the stored message and directs the information over the data bus 408 to the display driver 414 which processes the information and formats the information for presentation by a display 308 (FIG. 3) such as an LCD (liquid crystal display). At the time a selective call receiver's address is received, the alert signal is generated which can be routed through the data bus 408 to an alert generator 416 that generates the alert enable signal which is coupled to the audible alert device that was described above. Alternatively, when the vibrator alert is selected, as described above, the microcomputer generates an alert enable signal which is coupled through data bus 408 to the I/O port 413 to enable generation of a vibratory, or silent alert. Switch inputs are received by the I/O port 412 via the data bus 408. The switch inputs are processed by the CPU 410. Specifically, the CPU 410 retrieves the address of the selective call base station from RAM 404 and in conjunction with the timer counter 402 and the oscillator 418, the CPU 410 generates the ack-back signal which is passed via the data bus 40 to the transmitter.

The battery saver operation is controlled by the CPU 410 with battery saving signals which are directed over the data bus 408 to the I/O port 412 which couples to the power switch 310. Power is periodically supplied to the receiver to enable decoding of the received selective call receiver address signals and any message information which is directed to the selective call receiver. Specifically, when the selective call receiver 108 begins decoding the paging signal, the receiver is powered by the power switch. When the paging message is received and stored, the microcomputer 306 sends a signal to the power switch 310 to disable power to the receiver 304 and enable power to the transmitter for transmitting the ack-back signal.

Figure 5:
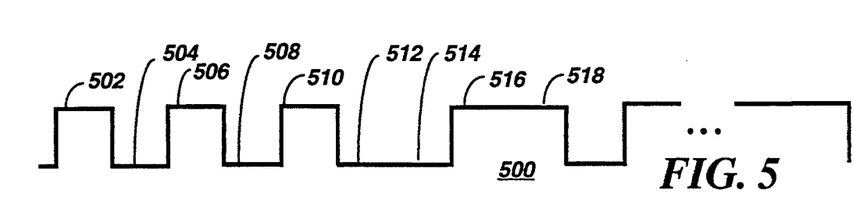
FIG. 5 is a timing diagram illustrating an example of a bit pattern of the acknowledge back signal of one of the group of the selective call receiver in accordance with the preferred embodiment of the present invention.

Referring to FIG. 5, a timing diagram is shown illustrating an example of a bit pattern of an acknowledge back (ack-back) signal of one of the group of the selective call receivers in accordance with the preferred embodiment of the present invention. As discussed, the ack-back signal is at a frequency lower than the paging signal from the selective call base station. The paging signal is, for example, within a range from sixteen-to-thirty (16–30) Kbs (kilo-bits-seconds) while the ack-back signal is, for example, within a range of one hundred (100) bits-per-second. The bit pattern 500 illustrates an example of one of the ack-back signal of one of the selective call receiver, for example one subchannel, of the group of selective call receivers that were paged. The bit pattern shows bits 502, 506, 510, and 516–518 representing digital "ones" and bits 504, 508, and 512–514 representing digital "zeros". The ack-back response, preferably, comprises a bit pattern having 300 bits, the values of the bits depend an the information being conveyed. For example, an N member group of selective call receivers 108, subsequent to the members of the group responding by sending N or less ack-back responses, the selective call base station will receive composite bits comprising the N or less ack-back responses within each bit time which will be further discussed in detail below.

Figure 6:
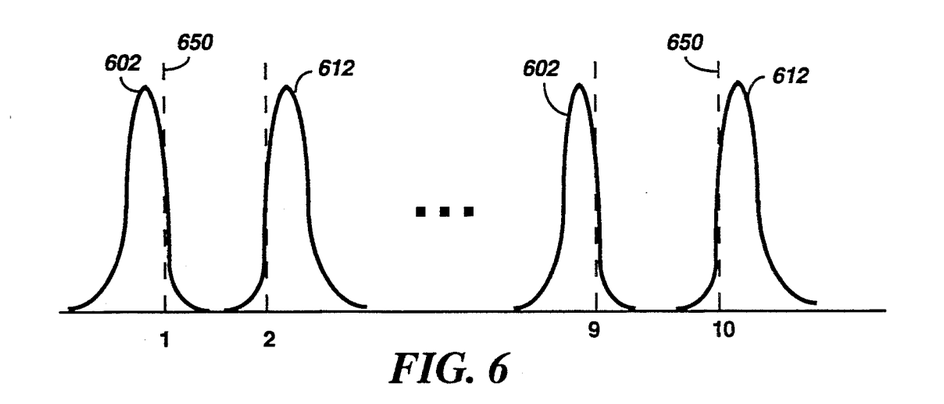
FIG. 6 is a frequency domain representation of a wide band channel illustrating ten subchannels representing the frequency domain representation of the acknowledge back signals in accordance with the preferred embodiment of the present invention.

Referring to FIG. 6, a frequency domain representation of a thirty (30) KiloHertz (KHz) channel illustrating, for example, ten subchannels (ten ack-back responses) representing the frequency domain representation of the acknowledge back signals in accordance with the preferred embodiment of the present invention. As discussed above, since each bit received by the selective call base station comprises a composite bit, then converting the composite bit into its frequency representation generates a frequency domain signal illustrating the N, for example ten, ack-back signals in their sub channels. The preferred modulation scheme is binary frequency shift keying (FSK) with each of the ten selective call receivers 108 within the group assigned to one of the preferred ten subchannels 1-10. Each of the ten selective call receivers 108 of the group is assigned to a different subfrequency corresponding to one of the ten subchannels for example. The subchannels 1-10 have an approximate separation of 300 Hz between tones representing "ones" 602 and tones representing "zero" 612. Each subchannel 1-10 is located on a central axis 650 which marks the center of each subchannels 1-10 for decoding the "ones" or "zeros" tone of each of the ten subchannels. As is well known to those skilled in the art, the oscillator of the selective call receiver must by sufficiently accurate to prevent a signal in its subchannel assignment to shift to either of its adjacent subchannels assigned to other selective call receivers of the group.

Figure 7:
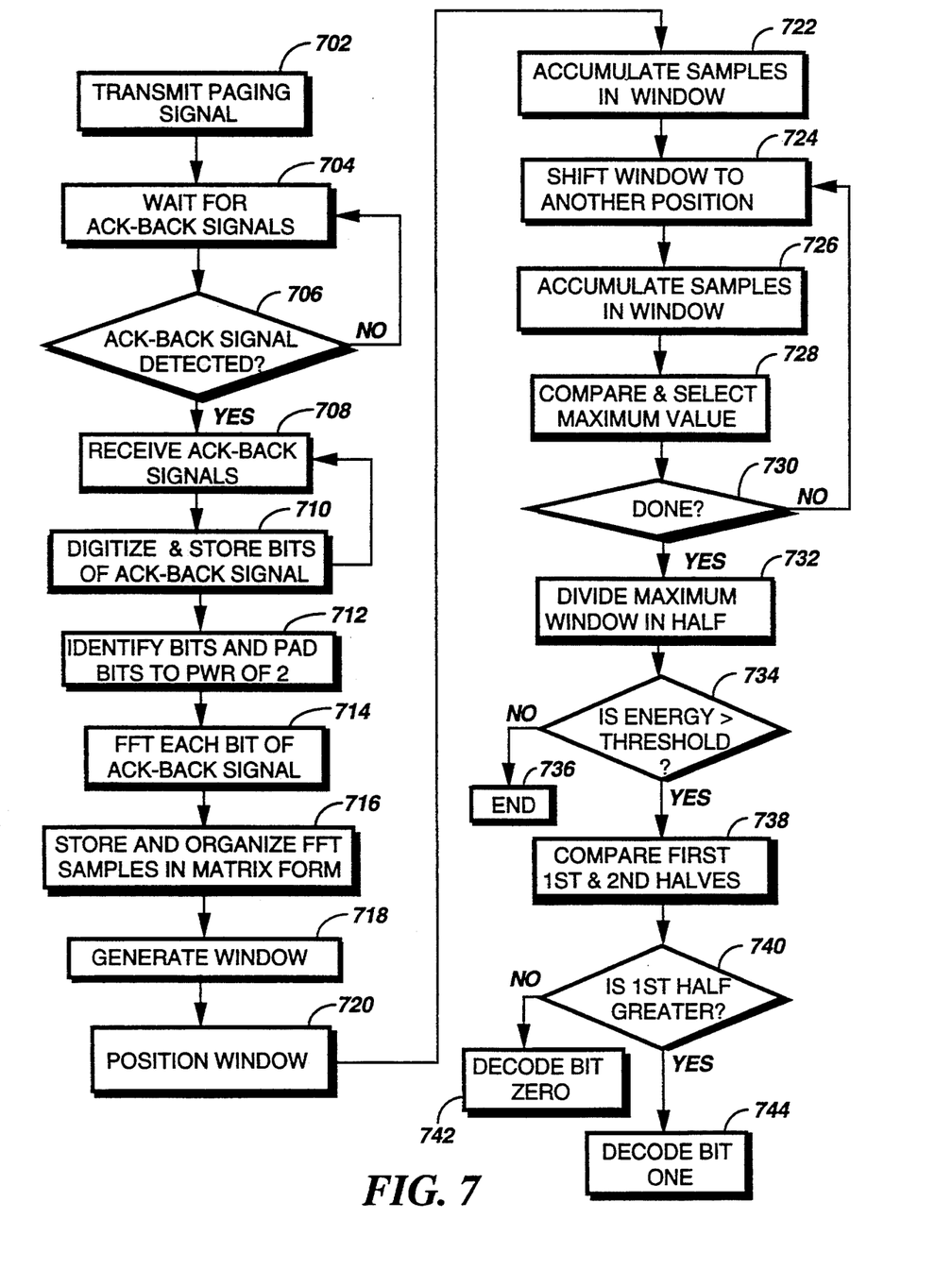
FIG. 7 is a flow diagram illustrating the operation of the DSP of the selective call base station in accordance with the preferred embodiment of the present invention.

Referring to FIG. 7, a flow diagram illustrating the decoding operation of the DSP of the selective call base station is shown in accordance with the preferred embodiment of the present invention. Operationally, the selective call base station 120-124 (FIG. 2) receives and encodes the message intended for, e.g., a preassigned group of selective call receivers, preferably a group of ten. The encoded paging message is transmitted to the group of selective call receivers, step 702. After transmission, the selective call base station 120-124 waits for the ack-back response from the group of selective call receivers, step 704. Step 706 detects when the ack-back signal is received from the group of selective call receivers which arrive substantially simultaneously. As is well known, each selective call receiver may be located anywhere in the coverage area of the selective call base station, therefore, for example, each selective call receiver irrespective of its location will delay before transmitting its ack-back signal to ensure that all selective call receivers of the group will transmit at substantially the same time. Each selective call receiver calculates it delay depending on received paging signal, for example, the paging signal may contain information indicative of the time of transmission which is used to determine the delay time for transmitting the ack-back signal.

When the ack-back signal is received, step 708, the A/D converter includes a sample-and-hold circuit (S/H) which samples the bits, preferably, at sixty (60) KHz rate, because the highest frequency present in the ack-back signal is thirty (30) KHz. For each bit, there are six hundred (600) samples because the frequency of the ack-back signal is one hundred (100) Hz and the sampling frequency is 60 KHz. The samples are digitized, organized and stored according to the representative bit, step 710. Steps 708 and 710 are repeated until all the bits of the ack-back signal are received, for example, the three hundred bits. The digitized samples representing each bit are identified and retrieved from memory. The 600 samples are increased (padded), preferably, by four-hundred-and-twenty-four (424) "zeros" resulting in one-thousand-and-twenty-four samples (1024) which is a power of two as required by the Fast Fourier Transform (FFT), step 712. The DSP transforms the time representation of the ack-back signal into a frequency representation (frequency domain signal) by performing the FFT on each bit of the ack-back signal, step 714. The frequency samples are stored, and then organized in a matrix format for subsequent processing, step 716.

Figure 8:
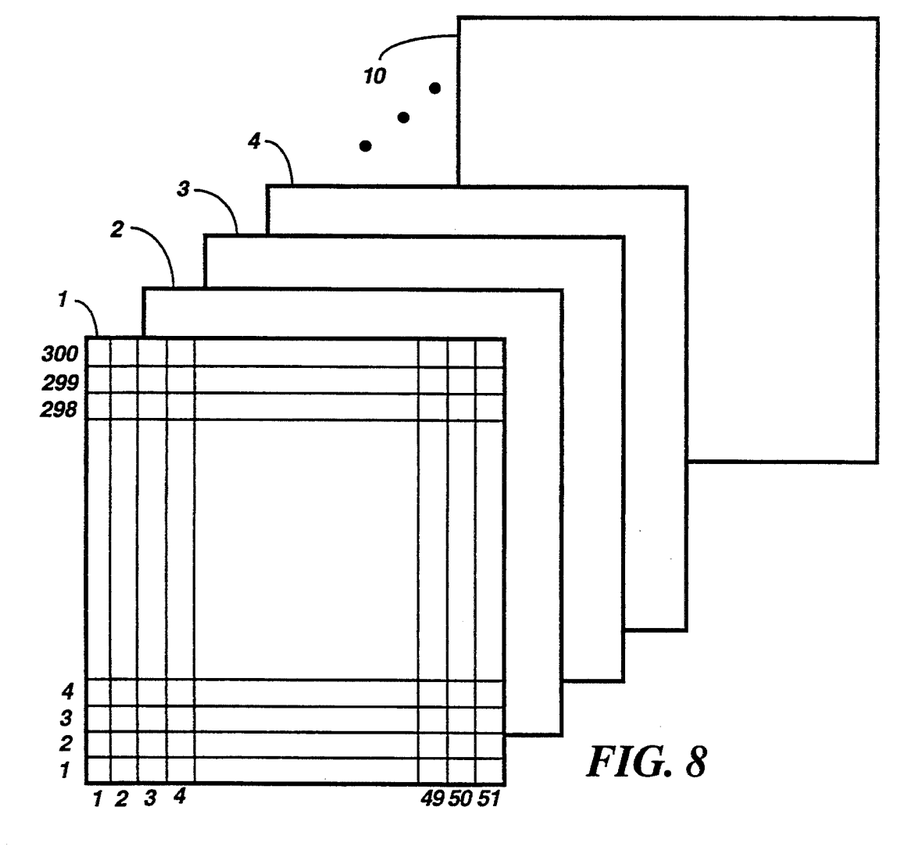
FIG. 8 illustrates a matrix representation having rows corresponding to the number of bits and columns corresponding to the number of frequency samples in accordance with the preferred embodiment of the present invention.

Referring to FIG. 8, the matrix representation is illustrated with rows corresponding to the number of bits and columns corresponding to the number of frequency samples in accordance with the preferred embodiment of the present invention. The matrices 1-10 correspond to the subchannels 1-10 illustrated in FIG. 6. The rows of the matrix 1 is numbered 1-300 corresponding to the 300 bits of the ack-back signal. The column of the matrix 1 is numbered 1-51 representing the number of frequency samples of each subchannel. As previously discussed, each bit comprises 1024 frequency samples (after padding), and because the highest frequency component present is 30 KHz then 514 high-order frequency samples may be discarded without affecting the integrity of the spectral signal representation. Five hundred and ten (510) frequency samples remain for the ten subchannels 1-10. Therefore, each subchannel is represented by fifty-one (51) samples, and by processing each matrix, each subchannel can be processed independently of the others because of its unique matrix representation.

Referring again to FIG. 7, a window is generated for decoding the information of the ack-back responses on each of the plurality of frequency (subchannels), step 718. The window is positioned for locating the peak of the frequency domain signal of the subchannel 1 across the 300 bits in the subchannel 1, step 720. Preferably, the window is wide enough to measure eight lines of samples of the fifty-one (51) sample lines. Once the window is position, preferably across the lowest eight samples of the 300 bits, the eight sample lines are accumulated, step 722. The accumulated eight sample lines represents the total energy in the window. The window is then shifted to the next position, preferably shifted one sample line higher, step 724. The energy is measured again by summing (accumulating) the original seven sample lines plus the additional one sample line to obtain another energy value for the new window position, step 726.

Figure 9:
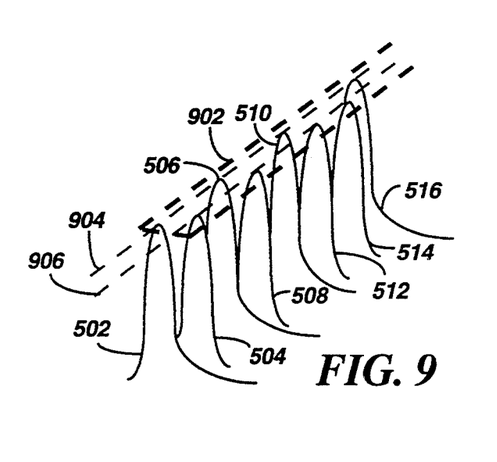
FIG. 9 is the frequency domain representation of the bits of a subchannel corresponding to FIG. 5 in accordance with the preferred embodiment of the present invention.

Referring to FIG. 9, the frequency domain representation of the bits of the subchannel 1 corresponding to FIG. 5 is shown in accordance with the preferred embodiment of the present invention. The frequency domain signal of the time domain bit pattern (FIG. 5) shows how each bit appears after the spectral transformation of the subchannel 1. Bits 502, 506, 510, and 516 represent "ones" as identified by line 904 indicating the first half of the window 902. Bits 504, 508, and 512-514 represent "zeros" as identified by line 906 indicating the second half of the window 902. As discussed, the ack-back signal is digital FSK modulated, where a binary "one" is assigned as the lower frequency tone 602 (see FIG. 6) and a binary "zero" is assigned the upper frequency tone 612 (see FIG. 6). The window 902 is shown positioned over all the bits of each subchannel, where bits 502–516 correspond to the first eight bits, and the window continues over the next 292 bits to enclose the 300 bits of each ack-back signal (subchannel). In this way, the position of the window is shifted until the maximum energy is located which corresponds to the peak of the frequency domain signal across all 300 bits of the subchannel 1.

Figure 10:
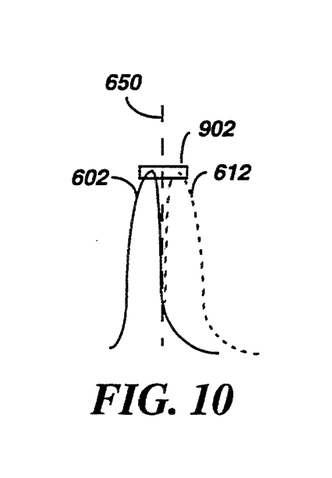
FIG. 10 is a frequency domain representation illustrating the decoding of the bits in the subchannel by generating a window in accordance with the preferred embodiment of the present invention.

Referring to FIG. 10, the frequency domain representation illustrates the decoding of the bits in the subchannel by generating the window in accordance with the preferred embodiment of the present invention. The tone 602 corresponding to the binary "one" is shown, and the tone 612 corresponding to the binary "zero" is shown by the dotted lines. The window 902 is ideally positioned to illustrate a tone occurring at its off-set from the center 650 of the subchannel 1. The dotted line representation of the "zero" tone shows the location where the zero tone would occur if the bit was a "zero" instead of a "one". It is understood the a "one" and a "zero" occurs in exclusion of the other.

Referring again to FIG. 7, after energy of the second window position is measured, the energy values are compared with each other to determine the position of the window corresponding to the maximum energy, step 728. Step 730 checks if all window positions are measured. If not, the DSP process continues to step 724 for shifting to another window position. When all window positions are measured, step 730, the process continues to step 732 which divides the window 902 in half. The energy of the window 902 is checked to determine if the total energy exceeds a threshold value, step 734. The threshold value indicates when a signal is present on the subchannel, therefore if the energy value is below the threshold, the process stops for that subchannel, step 736. Otherwise, the process continues to step 738 which compares the energy of the first half of the window 902 with the energy in the second half of the window 902. If the energy in the first half of the window 902 is greater than energy of the second half of the window 902, step 740, the bit is decoded as a binary "one", step 744. Otherwise the bit is decoded as a binary "zero" step 742.

In this way, the invention decodes a plurality of subchannels representing responses from a plurality of selective call receivers. Each selective call receiver responds on a preassigned subchannels, and although there are preferably a maximum of ten selective call receivers capable of responding substantially simultaneously, the invention does not require a ten separate bandpass filters to receive each ack-back signal on each subchannel. A filter on each subchannel would not provide a cost effective solution for decoding the plurality of ack-back signals. Furthermore, since the filter's response could not be less that the total subchannel to ensure the receipt of the ack-back signal, the signal-to-noise ratio (SNR) would decrease by at least a ratio of 51-to-8 because the window is able to detect the peak of the ack-back signal within a resolution of eight samples while the filter's response would at least have to be as wide as the 51 samples to ensure that the signal is not missed.

Even if the response of the bandpass filter of each subchannel was reduced below the size of the subchannel to improve the SNR, the reduction would cause the filter to fail to detect the ack-back bits that fall outside the filter's response but are still inside the allocated subchannel. Therefore, by FFT the composite bits and decoding the plurality of ack-back signals in the frequency domain, the invention eliminates the need for a plurality of filters, thereby providing a cost effective way for detecting a plurality of ack-back signals from a plurality of selective call receivers while maximizing the SNR of the received signal.

Figure 11:
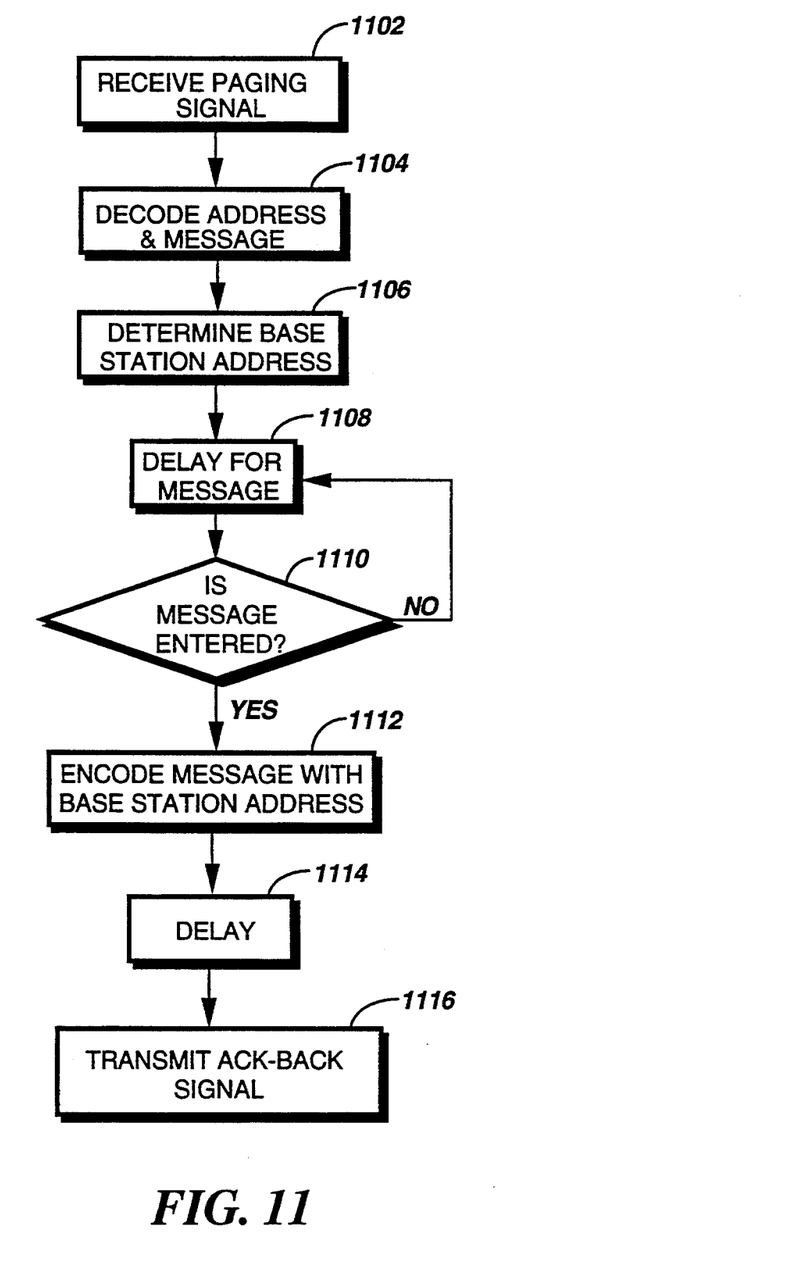
FIG. 11 is a flow diagram illustrating the operation of the selective call receiver in accordance with the preferred embodiment of the present invention.

FIG. 11 is a flow diagram illustrating the operation of the selective call receiver in accordance with the preferred embodiment of the present invention. The selective call receiver 108 receives the paging signal from the selective call base station, step 1102, and decodes its address and a message, if any, contained therein, step 1104. The paging signal preferably comprises a time of transmission which is also decoded, step 1104, to enable the selective call receiver 108 to calculate a delay time before it responds by sending an the ack-back response. The address of the selective call base station is also decoded from the received paging signal, step 1106. The selective call receiver 108 delays until a message is entered or until the time to transmit the ack-back response, step 1108. Preferably, the selective call receiver 108 provides an option to enable the user to enter, by techniques well known in the art, a message to be incorporated in the ack-back response, step 1110. If the message is not entered or the time to transmit has not elapsed, the process continues to step 1108. Alternatively, if a message is entered, the message is encoded with the address of the base station, step 1112, or if the time has elapsed, the ack-back signal is encoded with a default message. In some instance, the selective call receiver may not need to receive an address from the transmitting selective call base station, and simply transmits its message on its preassigned subchannel to the selective call base station. Upon receipt and encoding of the ack-back message, the selective call receiver delays until its time to transmit the ack-back response, step 1114. The ack-back response is transmitted to the selective call base station, step 1116.

In this way, the plurality of selective call receiver in a group, by decoding the transmission time of the paging signal, knows the longest time to receive the page and transmit an ack-back message of any selective call receiver in the outer edge of the coverage area. The selective call receiver is the able to delay for an appropriate time indicative of its current location ensuring that the plurality of selective call receivers respond substantially simultaneously.

In summary, a selective call base station receives a signal that comprises a plurality of communication signals. The selective call base station comprises an Analog-to-Digital (A/D) converter for digitizing the signal into a plurality of digitized bits. The A/D converter further comprises a Sampling-and-Hold (S/H) circuit for sampling the signal at a predetermined sampling rate generating a plurality of digitized samples for each of the plurality of digitized bits. A memory stores the signal corresponding the plurality of digitized samples, and a Digital Signal Processor (DSP) converts each of the plurality of digitized bits into a frequency domain signal that comprises a plurality of frequency samples. The DSP further comprises an identifier identifying the plurality of digitized samples corresponding to each of the plurality of digitized bits. A padding circuit increases the plurality of digitized samples of the plurality of digitized bits to a power of two. The DSP performs a Fast Fourier Transform (FFT) on the plurality of digitized samples corresponding to each of the plurality of digitized bits to generate the plurality of frequency samples. A table organizer organizes the plurality of frequency samples in a matrix which has a number of rows comprise the plurality of digitized bits and a number of columns comprise the plurality of frequency samples. The memory stores the plurality of frequency samples corresponding to each of the plurality of digitized bits, and a decoder decodes the plurality of communication signals from the plurality of frequency samples. The decoder further comprises a generator for generating a window for measuring energy of at least one frequency sample of the plurality of digitized bits in each of the plurality of communication signals. The generator further comprises a controller for positioning the window on a corresponding one of the plurality of digitized bits of the frequency domain signals. An accumulator accumulates the at least one frequency sample in the window for measuring the energy of the window. The controller shifts the window for measuring another one of the plurality of frequency samples. The controller continues shifting the window until the plurality of frequency samples of the one of the plurality of communication signals have been measured. A determinator determines the at least one frequency sample of each of the plurality of communication signals that has a maximum energy. The determinator further comprises a comparator for comparing the energy of each position of the window for determining the position of the window corresponding to the maximum energy. A divider divides the window corresponding to the maximum energy into a first and second portions, and the comparator compares the first portion with the second portion for determining a binary representation of each of the digitized bits.

In this way, the invention decodes a plurality of subchannels representing responses from a plurality of selective call receivers. Each selective call receiver responds on a preassigned subchannels, and although there are preferably a maximum of ten selective call receivers capable of responding substantially simultaneously, the invention does not require a ten separate bandpass filters to receive each ack-back signal on each subchannel. A filter on each subchannel would not provide a cost effective solution for decoding the plurality of ack-back signals. Furthermore, since the filter's response could not be less than the total subchannel to ensure the receipt of the ack-back signal, the signal-to-noise ratio (SNR) would decrease by at least a ratio of 51-to-8 because the window is able to detect the peak of the ack-back signal within a resolution of eight samples while the filter's response would at least have to be as wide as the 51 samples to ensure that the signal is not missed.

Even if the response of the bandpass filter of each subchannel was reduced below the size of the subchannel to improve the SNR, the reduction would cause the filter to fail to detect the ack-back bits that fall outside the filter's response but are still inside the allocated subchannel. Therefore, the invention provides a cost effective way for detecting a plurality of ack-back signals from a plurality of selective call receivers while maximizing the SNR of the received signal.

We claim:

1. A method for receiving a first signal comprising a plurality of second signals, comprising the steps of:
    a) digitizing the first signal into a plurality of digitized bits;
    b) converting the plurality of digitized bits into a frequency domain signal comprising a plurality of frequency samples;
    c) storing the plurality of frequency samples corresponding to the plurality of digitized bits, wherein the step of storing further comprising a step of organizing the plurality of frequency samples in a matrix representation having a number of rows comprising the plurality of digitized bits and a number of columns comprising the plurality of frequency samples corresponding to one of the plurality of second signals; and
    d) decoding the plurality of second signals from the plurality of frequency samples, the step of decoding further comprising the steps of:
    e) generating at least one window for measuring energy of at least one frequency sample corresponding to a column of the matrix representation; and
    f) determining the at least one frequency sample corresponding to the column of the matrix representation having a maximum energy measured in step (e).

2. The method according to claim 1 wherein the step of digitizing further comprising a step of sampling the signal at a predetermined sampling rate for generating a plurality of digitized samples for each of the plurality of digitized bits.

3. The method according to claim 2 wherein the step of converting further comprising steps of:
    identifying the plurality of digitized samples corresponding to each of the plurality of digitized bits;
    increasing the plurality of digitized samples of the plurality of digitized bits to a power of two; and
    performing a Fast Fourier Transform (FFT) on the plurality of digitized samples corresponding to each of the plurality of digitized bits for generating the plurality of frequency samples.

4. The method according to claim 1 wherein the step of generating further comprising steps of:
    positioning the window on the at least one frequency sample across the plurality of digitized bits of one of the plurality of second signals;
    accumulating the at least one frequency sample in the window for measuring the energy of the window; and
    shifting the window for measuring another one of the plurality of frequency samples, the step of shifting continues until the plurality of frequency samples of the one of the plurality of second signals have been measured.

5. The method according to claim 1 wherein the step of determining further comprising steps of:
    comparing the energy of each position of the window for determining the position of the window corresponding to the maximum energy;
    dividing the window corresponding to the maximum energy into a first and second portions; and
    comparing the first portion with the second portion for determining a binary representation of each of the plurality of digitized bits.

6. In a selective call communication system, a method for communicating with a plurality of selective call receivers, comprising the steps of:
    a) transmitting a selective call signal to the plurality of selective call receivers;
    b) receiving a signal comprising acknowledgment signals from at least one of the plurality of selective call receivers receiving the selective call signal;
    c) digitizing the signal;

d) storing the signal corresponding to a plurality of digitized bits, wherein the step of storing further comprising a step of organizing the plurality of frequency samples in a matrix representation having a number of rows comprising the plurality of digitized bits and a number of columns comprising the plurality of frequency samples;

e) converting the plurality of digitized bits into a frequency domain signal comprising a plurality of frequency samples; and f) storing the plurality of frequency samples corresponding to the plurality of digitized bits; and g) decoding the acknowledgment signals from the plurality of frequency samples, the step of decoding further comprising the steps of:

h) generating at least one window for measuring energy of at least one frequency sample corresponding to a column of the matrix representation; and i) determining the at least one frequency sample corresponding to the column of the matrix representation of the acknowledgment signals having a maximum energy measured in step (h).

7. The method according to claim 6 wherein the step of digitizing further comprising a step of sampling the signal at a predetermined sampling rate for generating a plurality of digitized samples for each of the plurality of digitized bits.

8. The method according to claim 7 wherein the step of converting further comprising steps of:

identifying the plurality of digitized samples corresponding to each of the plurality of digitized bits;

increasing the plurality of digitized samples of the plurality of digitized bits to a power of two; and performing a Fast Fourier Transform (FFT) on the plurality of digitized samples for spectral transforming each of the plurality of digitized bits into a frequency representation thereof.

9. The method according to claim 6 wherein the step of generating further comprising steps of:

positioning the window on the at least one frequency sample across the plurality of digitized bits of one of the acknowledgment signals;

accumulating the at least one frequency sample for measuring the energy of the window; and shifting the window for measuring another of the plurality of frequency samples, the step of shifting continuing until the plurality of frequency samples of the one of the acknowledgment signals have been measured.

10. The method according to claim 6 wherein the step of determining further comprising steps of:

comparing the energy of each position of the window for determining the position of the window corresponding to the maximum energy;

dividing the window corresponding to the maximum energy into a first and second portions; and comparing the first portion with the second portion for determining a binary representation of the plurality of digitized bits.

11. A selective call base station for receiving a signal comprising a plurality of communication signals, comprising:

an Analog-to-Digital (A/D) converter for digitizing the signal;

a memory for storing the signal as a plurality of digitized bits;

a Digital Signal Processor (DSP) for converting the plurality of digitized bits into a frequency domain signal comprising a plurality of frequency samples, wherein the DSP further comprises a table organizer for organizing the plurality of frequency samples in a matrix representation having a number of rows comprising the plurality of digitized bits and a number of columns comprising the plurality of frequency samples corresponding to one of the plurality of communication signals;

said memory for storing the plurality of frequency samples corresponding to the plurality of digitized bits; and a decoder for decoding the plurality of communication signals from the plurality of frequency samples, the decoder further comprising:

a generator for generating at least one window for measuring energy of at least one frequency sample corresponding to a column of the matrix representation; and a determinator for determining the at least one frequency sample corresponding to the column of the matrix representation of the plurality of communication signals having a maximum energy.

12. The selective call base station according to claim 11 wherein the A/D converter further comprising a Sampling-and-Hold (S/H) circuit for sampling the signal at a predetermined sampling rate generating a plurality of digitized samples for each of the plurality of digitized bits.

13. The selective call base station according to claim 12 wherein the DSP further comprising:

an identifier for identifying the plurality of digitized samples corresponding to each of the plurality of digitized bits;

a padding circuit for increasing the plurality of digitized samples of the plurality of digitized bits to a power of two; and wherein the DSP performs a Fast Fourier Transform (FFT) on the plurality of digitized samples corresponding to each of the plurality of digitized bits for generating the plurality of frequency samples.

14. The selective call base station according to claim 11 wherein the generator further comprises:

a controller for positioning the window on the at least one frequency sample across the plurality of digitized bits of one of the plurality of communication signals;

an accumulator for accumulating the at least one frequency sample in the window for measuring the energy of the window; and the controller shifting the window for measuring another one of the plurality of frequency samples, the controller continues shifting the window until the plurality of frequency samples of the one of the plurality of communication signals have been measured.

15. The selective call base station according to claim 11 wherein the determinator further comprising:

a comparator for comparing the energy of each position of the window for determining the position of the window corresponding to the maximum energy;

a divider for dividing the window corresponding to the maximum energy into a first and second portions; and the comparator compares the first portion with the second portion for determining a binary representation of each of the digitized bits.

16. A selective call communication system comprising a selective call base station for communicating with a plurality of selective call receivers, the selective call base station comprising:

a transmitter for transmitting a selective call signal to the plurality of selective call receivers;

a receiver for receiving a signal comprising acknowledgment signals from at least one of the plurality of selective call receivers receiving the selective call signal;

an Analog-to-Digital (A/D) converter for digitizing the signal;

a memory for storing the signal corresponding a plurality of digitized bits;

a Digital Signal Processor (DSP) for converting the plurality of digitized bits into a frequency domain signal comprising a plurality of frequency samples, wherein the DSP further comprises a table organizer for organizing the plurality of frequency samples in a matrix representation having a number of rows comprising the plurality of digitized bits and a number of columns comprising the plurality of frequency samples; and said memory for storing the plurality of frequency samples corresponding to the plurality of digitized bits; and a decoder for decoding the acknowledgment signals from the plurality of frequency samples, the decoder further comprising:

a generator for generating at least one window for measuring energy of at least one frequency sample corresponding to a column of the matrix representation; and a determinator for determining the at least one frequency sample corresponding to the column of the matrix representation of the acknowledgment signals having a maximum energy.

17. The selective call base station according to claim 16 wherein the A/D converter further comprising a Sampling-and-Hold (S/H) circuit for sampling the signal at a predetermined sampling rate generating a plurality of digitized samples for each of the plurality of digitized bits.

18. The selective call base station according to claim 17 wherein the DSP further comprising steps of:

an identifier for identifying the plurality of digitized samples corresponding to each of the plurality of digitized bits;

a padding circuit for increasing the plurality of digitized samples of the plurality of digitized bits to a power of two; and wherein the DSP performs a Fast Fourier Transform (FFT) on the plurality of digitized samples for spectral transforming each of the plurality of digitized bits into a frequency representation thereof.

19. The selective call base station according to claim 16 wherein the generator further comprising steps of:

a controller for positioning the window on the at least one frequency sample across the plurality of digitized bits of one of the acknowledgment signals;

an accumulator for accumulating the at least one frequency sample for measuring the energy of the window; and the controller shifting the window for measuring another of the plurality of frequency samples, the controller continues shifting the window until the plurality of frequency samples of the one of the acknowledgment signals have been measured.

20. The selective call base station according to claim 16 wherein the determinator further comprising:

a comparator for comparing the energy of each position of the window for determining the position of the window corresponding to the maximum energy;

a divider for dividing the window corresponding to the maximum energy into a first and second portions; and the comparator comparing the first portion with the second portion for determining a binary representation of the plurality of digitized bits.

21. A selective call base station for receiving a signal comprising a plurality of communication signals, comprising:

an Analog-to-Digital (A/D) converter for digitizing the signal into a plurality of digitized bits, the A/D converter further comprises a Sampling-and-Hold (S/H) circuit for sampling the signal at a predetermined sampling rate generating a plurality of digitized samples of the plurality of digitized bits;

a memory for storing the signal corresponding to the plurality of digitized samples;

a Digital Signal Processor (DSP) for converting the plurality of digitized samples into a frequency domain signal comprising a plurality of frequency samples, the DSP further comprising:

an identifier for identifying the plurality of digitized samples corresponding to each of the plurality of digitized bits;

a padding circuit for increasing the plurality of digitized samples of the plurality of digitized bits to a power of two;

wherein the DSP performs a Fast Fourier Transform (FFT) on the plurality of digitized samples corresponding to the plurality of digitized bits for generating the plurality of frequency samples; and a table organizer for organizing the plurality of frequency samples in a matrix representation having a number of rows comprising the plurality of digitized bits and a number of columns comprising the plurality of frequency samples;

said memory for storing the plurality of frequency samples corresponding to the plurality of digitized bits; and a decoder for decoding the plurality of communication signals from the plurality of frequency samples, the decoder further comprising:

a generator for generating a window for measuring energy of at least one frequency sample of the plurality of digitized bits of the plurality of communication signals, the generator further comprises:

a controller for positioning the window on a corresponding one of the plurality of digitized bits of the frequency domain signals;

an accumulator for accumulating the at least one frequency sample in the window for measuring the energy of the window; and the controller shifting the window for measuring another one of the plurality of frequency samples, the controller continues shifting the window until the plurality of frequency samples of the one of the plurality of communication signals have been measured;

a determinator for determining the at least one frequency sample of each of the plurality of communication signals having a maximum energy, the determinator further comprising:

a comparator for comparing the energy of each position of the window for determining the position of the window corresponding to the maximum energy;

a divider for dividing the window corresponding to the maximum energy into a first and second portions; and the comparator comparing the first portion with the second portion for determining a binary representation of each of the digitized bits.

* * * * *